United States Patent
Hansen et al.

(10) Patent No.: US 6,978,374 B1
(45) Date of Patent: Dec. 20, 2005

(54) AUTHORIZATION KEY SYSTEM FOR SELECTIVELY CONTROLLING THE PERFORMANCE OF A DATA PROCESSING SYSTEM

(75) Inventors: Lee B. Hansen, Forest Lake, MN (US); Kerry M. Langsford, Roseville, MN (US); Daniel J. Lenz, Maplewood, MN (US); Ronald S. Tanning, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 956 days.

(21) Appl. No.: 09/676,162

(22) Filed: Sep. 29, 2000

(51) Int. Cl.[7] .............................................. H04K 1/00
(52) U.S. Cl. ...................... 713/183; 713/189; 713/191
(58) Field of Search ............................... 713/189, 191, 713/183; 712/32–43

(56) References Cited

U.S. PATENT DOCUMENTS

| | | | | |
|---|---|---|---|---|
| 5,041,962 A | | 8/1991 | Lunsford ..................... 364/200 |
| 5,365,587 A | * | 11/1994 | Campbell et al. ........... 713/183 |
| 5,367,699 A | | 11/1994 | Lange et al. ................ 395/800 |
| 5,408,647 A | | 4/1995 | Landry ....................... 395/575 |
| 5,530,753 A | * | 6/1996 | Easter et al. ................ 713/191 |
| 5,553,144 A | * | 9/1996 | Almquist et al. ........... 713/100 |
| 5,574,770 A | | 11/1996 | Yoo et al. ..................... 379/34 |
| 5,617,576 A | | 4/1997 | Solari et al. ................ 395/800 |
| 5,627,962 A | | 5/1997 | Goodrum et al. ....... 395/182.11 |
| 5,761,518 A | | 6/1998 | Boehling et al. ............ 395/821 |
| 5,794,011 A | | 8/1998 | Paul et al. ................... 395/500 |
| 5,802,162 A | | 9/1998 | Beltrano et al. ............. 379/242 |
| 5,864,653 A | | 1/1999 | Tavallaei et al. ............ 315/181 |
| 5,884,091 A | | 3/1999 | Ghori et al. ................. 395/800 |
| 5,911,083 A | | 6/1999 | Kuslak ................... 395/800.41 |
| 5,931,930 A | | 8/1999 | Krick et al. ................. 710/100 |
| 5,982,899 A | * | 11/1999 | Probst ............................ 713/1 |
| 6,490,684 B1 | * | 12/2002 | Fenstemaker et al. ....... 713/182 |

* cited by examiner

*Primary Examiner*—Gregory Morse
*Assistant Examiner*—Jacob Lipman
(74) *Attorney, Agent, or Firm*—Charles A. Johnson; Mark T. Starr; Brian N. Tufte

(57) ABSTRACT

The present invention provides methods and apparatus for authorizing a temporary or permanent increase in the performance of a data processing system while providing little or no down time. This is accomplished by including extra or additional computer resources in the data processing system when, for example, it is provided to the customer. However, only those resources required to achieve the performance level purchased by the customer are enabled for use during normal operation. To temporarily or permanently increase the performance level of the data processing system, the customer purchases an authorization key. When the customer desires increased performance, the authorization key is registered on the data processing system, which enables the use of additional hardware resources. The authorization key may be used akin to an insurance policy that allows selective increases in performance level to accommodate unplanned increases in performance requirements.

40 Claims, 16 Drawing Sheets

OS IP TABLE

| AVAILABLE IPs | IP PERFORMANCE | UNAVAILABLE IPs |
|---|---|---|
| IP-000 | 67% | |
| IP-001 | 67% | |
| | | IP-002 |
| | | IP-003 |
| | | IP-004 |
| | | IP-005 |
| | | IP-006 |
| | | IP-007 |

FIG. 2

OS IP TABLE

| AVAILABLE IPs | IP PERFORMANCE | UNAVAILABLE IPs |
|---|---|---|
| IP-000 | 100% | |
| IP-001 | 100% | |
| IP-002 | 100% | |
| IP-003 | 100% | |
| | | IP-004 |
| | | IP-005 |
| | | IP-006 |
| | | IP-007 |

FIG. 3

NORMAL AUTHORIZATION KEY

| PARAMETER | ATTRIBUTES |
|---|---|
| MODEL NUMBER | IX6601-41 |
| SERIAL NUMBER | 00001000 |
| MAXIMUM PERFORMANCE | 100% |
| MAXIMUM NUMBER OF IPs | 1 |
| IP IDENTIFIER | IP0 |

*FIG. 7*

OPTIONAL AUTHORIZATION KEY

| PARAMETER | ATTRIBUTES |
|---|---|
| MODEL NUMBER | IX6601-41 |
| SERIAL NUMBER | 00001000 |
| MAXIMUM PERFORMANCE | 100% |
| MAXIMUM NUMBER OF IPs | Any 1 |
| IP IDENTIFIER | N/A |
| EXPIRATION DATE | 1-Jan-01 |
| MAXIMUM TIME OF USE | 10 DAYS |

*FIG. 8*

ENHANCED PERFORMANCE KEY

| PARAMETER | ATTRIBUTES |
|---|---|
| MODEL NUMBER | IX6802-88 |
| SERIAL NUMBER | 00001002 |
| MAXIMUM PERFORMANCE | 100% |
| MAXIMUM NUMBER OF IPs | 8 |
| IP IDENTIFIER | N/A |
| EXPIRATION DATE | 1-Jan-01 |
| MAXIMUM TIME OF USE | 10 DAYS |

*FIG. 9*

OPTIONAL AUTHORIZATION KEY

| PARAMETER | ATTRIBUTES |
|---|---|
| MODEL NUMBER | IX6802-84 |
| SERIAL NUMBER | 00001001 |
| MAXIMUM PERFORMANCE | 100% |
| MAXIMUM NUMBER OF IPs | Any 4 |
| IP IDENTIFIER | N/A |
| EXPIRATION DATE | 1-Jan-01 |
| MAXIMUM TIME OF USE | 10 DAYS |

*FIG. 10*

NORMAL AUTHORIZATION KEY

| PARAMETER | ATTRIBUTES |
|---|---|
| MODEL NUMBER | IX6602-54 |
| SERIAL NUMBER | 00001002 |
| MAXIMUM PERFORMANCE | 67% |
| MAXIMUM NUMBER OF IPs | 4 |
| IP IDENTIFIER | IP0, IP2, IP4, IP6 |

*FIG. 11*

OPTIONAL AUTHORIZATION KEY

| PARAMETER | ATTRIBUTES |
|---|---|
| MODEL NUMBER | IX6802-88 |
| SERIAL NUMBER | 00001002 |
| MAXIMUM PERFORMANCE | 100% |
| MAXIMUM NUMBER OF IPs | 8 |
| IP IDENTIFIER | N/A |
| EXPIRATION DATE | 1-Jan-01 |
| MAXIMUM TIME OF USE | 10 DAYS |

*FIG. 12*

AUTHORIZATION KEY SYSTEM FOR SELECTIVELY CONTROLLING THE PERFORMANCE OF A DATA PROCESSING SYSTEM

TECHNICAL FIELD OF THE INVENTION

This invention relates generally to data processing systems, and more particularly, to methods and apparatus for selectively controlling the performance of data processing systems.

BACKGROUND OF THE INVENTION

Over the past decade, individuals and organizations have become more heavily dependent on computers and computer networks. An ever increasing amount of mission critical data is processed and stored on such systems. As a result, it is imperative that mission critical computer resources be as reliable as possible. It is also imperative that mission critical computer resources have enough processing power to handle peak performance loads, both during normal operation and in the event certain computer resources fail.

To help improve the reliability of mission critical computer resources, it is common for businesses to place their computer systems in one or more data centers. Data centers are buildings that are specially constructed to house mission critical computer resources. Data centers often include redundant power supplies, temperature and humidity control, fire walls, etc. Even with these capabilities, however, there is still a chance that a computer system will fail or be destroyed.

One way of reducing the impact of such failures is to maintain a redundant computer system that operates in parallel with a primary computer system. The redundant computer system is often placed at a separate location from the primary computer system to help minimize the possibility that both computer systems will be destroyed in the event of a disaster. If one system should fail, the remaining system remains active to process the mission critical data. A limitation of this approach is that it is relatively expensive to maintain two or more separate computer systems, each having the performance capacity to handle the peak loads of the day to day operations of a business.

A variation of this approach is to maintain multiple computer systems wherein each computer system is dedicated to a particular task or set of tasks. In one example, a primary computer system may be dedicated to processing the day-to-day operation of a business, and a secondary computer may be dedicated to supporting development work or other tasks. If the primary computer system should fail, the secondary computer can be switched over to support the day-to-day operations of the business, and the development work can be temporarily suspended, if necessary. A limitation of this approach is that it is often not economically feasible to provide the same processing power in the secondary computer system. Accordingly, the secondary computer system may not be able to provide the required processing power to keep up with the day-to-day operations of the business.

Another problem faced by many growing businesses is that the processing power required to support the day to day operations of the business grows with time. This is particularly true for rapidly growing e-commerce companies, but also applies to other companies as well. To increase the processing power of many computer systems, additional processors or memory must typically be installed. This often requires that the computer system to be brought down. Bringing the computer system down, however, can significantly disrupt the operation of the business.

Another problem faced by many businesses is that the peak loads that are required to keep up with the day to day operations of the business are often difficult to predict. For example, if there is a delay in gathering year end data, there may be little time to process the data before the results must be published or otherwise released. The processing power required to process such year end data on such short notice may exceed the processing power of the available computer resources. In another example, e-commerce servers may experience severe peak loads during certain times of the year, such as the Christmas season. The extent of these peak loads is also often difficult to predict. To upgrade the processing power of such computer systems, the system often must be brought down to install additional resources. This downtime can often be very detrimental to the operations of the business.

What would be desirable, therefore, is a method and apparatus for authorizing a temporary or permanent increase in the performance of a customer's computer system. It would also be desirable if the increase in performance could be accomplished with little or no down time. This could help provide uninterrupted growth capacity, temporary increases in processing capacity to support high demand peak periods, and disaster recovery support should a primary computer system fail or become destroyed.

SUMMARY OF THE INVENTION

The present invention provides methods and apparatus for authorizing a temporary or permanent increase in the performance of a data processing system while providing little or no down time. This is accomplished by including extra or additional resources in the data processing system when, for example, it is provided to the customer. However, only those resources required to achieve the performance level purchased by the customer are enabled for use during normal operation. To temporarily or permanently increase the performance level of the data processing system, the customer can purchase an authorization key. When the customer desires increased performance, the authorization key is registered on the data processing system, which enables the use of additional hardware resources. The authorization key preferably identifies which additional processing resources are authorized for use, the maximum time the additional resources are authorized for use, and an expiration date. The authorization key may be used akin to an insurance policy that allows selective increases in performance level to accommodate unplanned increases in performance requirements.

In one illustrative embodiment of the present invention, the data processing system is delivered with a first authorization key, which when registered authorizes the use of limited resources to provide the desired initial performance level purchased by the customer. The initial performance level is less than the maximum performance level that can be achieved by the customer's data processing system. If the customer desires the option of selectively increasing the performance level of the data processing system, a second authorization key may be purchased. The second authorization key, when registered, may authorize the use of additional resources to increase the performance level above the initial performance level.

The second authorization key preferably has an expiration date, after which the customer's data processing system returns to the initial performance level. The second authorization key may also have a maximum time of use indicator, which indicates the maximum time that the customer's data processing system can operate at the increased performance level. Once the maximum time of use is reached, the customer's data processing system returns to the initial performance level. The customer may then purchase an additional authorization key to authorize additional periods of increased performance.

For security reasons, it is contemplated that the authorization key may be verified prior to becoming effective. This may occur when the authorization key is registered on the customer's data processing system. The customer's data processing system may have, for example, a serial number. The authorization key may also include a corresponding serial number. If the serial number of the authorization key does not match the serial number of the customer's data processing system, the authorization key may be rejected as invalid.

Preferably, the performance level of the customer's data processing system can be changed while operating at full production capacity. This may be accomplished under software control, such as under the control of the operating system. In one illustrative embodiment, the operating system selectively increases the utilization percentage of selected processors to affect the increased performance level. In another illustrative embodiment, the operating system activates previously unavailable processors. As further described herein, such a system may help provide uninterrupted growth capacity, temporary increased processing capacity to support high demand peak periods, and disaster recovery support should a primary data processing system become destroyed.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 2 is a diagram showing an illustrative Instruction Processor (IP) table for the data processing system of FIG. 1 with two IP's authorized for use, each at a reduced performance level;

FIG. 3 is a diagram showing an illustrative Instruction Processor (IP) table for the data processing system of FIG. 1 with four IP's authorized for use, each at a maximum performance level;

FIG. 7 is a diagram showing an illustrative normal authorization key for a two processor data processing system with one IP authorized for use;

FIG. 8 is a diagram showing an illustrative optional authorization key for the two processor data processing system of FIG. 7 with any one IP authorized for use;

FIG. 9 is a diagram showing an illustrative normal authorization key for an eight processor data processing system with four IP's authorized for use;

FIG. 10 is a diagram showing an illustrative optional authorization key for the eight processor data processing system of FIG. 9 with any four IP's authorized for use;

FIG. 11 is a diagram showing an illustrative normal authorization key for an eight processor data processing system with four IP's authorized for use, each at a reduced performance level;

FIG. 12 is a diagram showing an illustrative optional authorization key for the eight processor data processing system of FIG. 11 with eight IP's authorized for use, all at a maximum performance level;

DETAILED DESCRIPTION OF THE INVENTION

Figure 1:
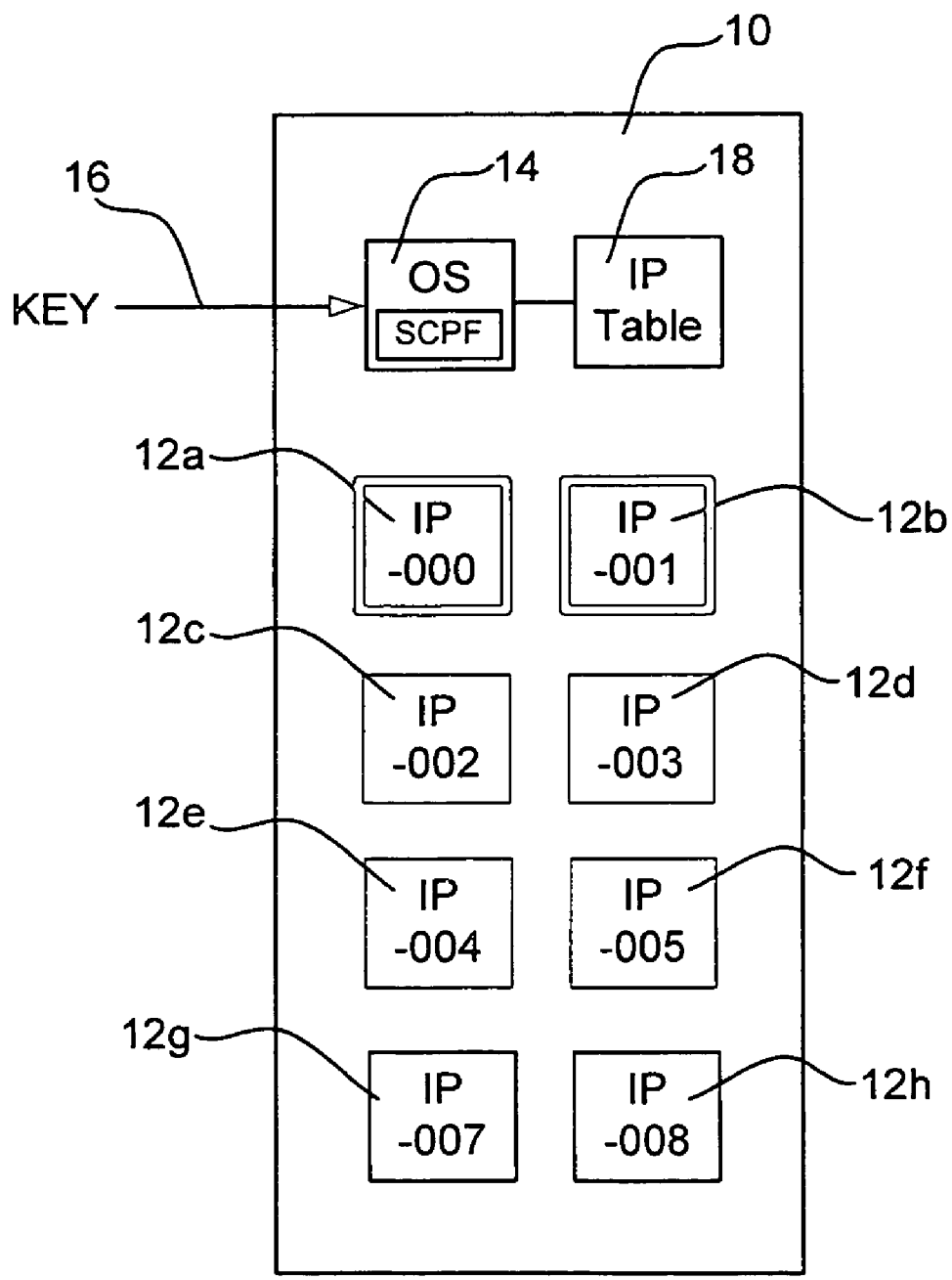
FIG. 1 is a block diagram showing an illustrative data processing system with eight processors installed.

FIG. 1 is a block diagram showing an illustrative data processing system 10 with eight processors (IPs) 12a–12g installed. The data processing system preferably operates under the control of operating system 14. The operating system 14 preferably runs on one of the eight instruction processors 12a–12g. The data processing system is preferably a Unisys 2200 or ClearPath HMP IX system, both available from the Unisys Corporation, but may be any type of multi-processor data processing system.

In some prior art multiprocessor data processing systems, such as the Unisys 2200 and ClearPath HMP systems, selected processors can be activated or deactivated under software control by using, for example, an IP "up" command and an IP "down" command, respectively, typically presented from a system console. The IP "up" command causes the operating system of the data processing system to "up" a designated processor in the system. The IP "up" command is commonly used after an initial boot of the data processing system to bring each processor on line. The IP "down" command causes the operating system to "down" a previously "up" processor. The IP "down" command is useful in, for example, bringing down a processor that is suspected of producing errors. Because execution of the IP "up" and IP "down" command is under the control of the operating system, they can often be executed while the data processing system 10 is running, even at full production capacity.

The IP "up" and IP "down" commands of the prior art can be used in conjunction with the present invention. In the illustrative embodiment shown in FIG. 1, all eight instruction processors 12a–12g may be installed in the system before, for example, the system is shipped to a customer. Alternatively, some of the processors may be installed after the fact, such as after the data processing system is already installed at the customer's site. In either case, the customer may have only purchased the right to use selected processors, such as instruction processors 12a and 12b. Instruction processors 12a and 12b may provide sufficient performance to handle the normal day to day operation of the customer's business.

The performance level of the data processing system 10 may be temporarily or permanently increased by purchasing an authorization key 16. Once procured, the authorization key can be registered on the data processing system 10. Once registered, the authorization key allows the customer to "up" or "down" additional authorized processors to selectively increase the performance level of the data processing system 10.

In one illustrative embodiment of the present invention, the data processing system 10 is delivered with a first authorization key, which when registered, authorizes the use of limited resources to provide the desired initial performance level purchased by the customer. The initial performance level is typically less than the maximum performance level of the customer's data processing system 10.

If the customer desires the option to selectively increase the performance level of the data processing system 10, a second authorization key may be purchased. The second authorization key, when registered, may authorize the use of additional resources to increase the performance level of the data processing system 10 above the initial performance level.

The second authorization key preferably has an expiration date, after which time the second authorization key cannot be used and the customer's data processing system 10 returns to the initial performance level. One or more warning messages may be displayed prior to the expiration date to warn the customer that the expiration date is approaching. The second authorization key may also have a maximum time of use indicator, which indicates the maximum time that the customer's data processing system 10 can operate at the increased performance level. Once the maximum time of use is reached, the customer's data processing system 10 may automatically return to the initial performance level. Again, one or more warning messages may be provided as the maximum time of use approaches. The customer may elect to purchase additional authorization keys to authorize additional periods of increased performance, as desired.

For security reasons, it is contemplated that the data processing system 10 may verify the authorization key 16 prior to use. This may occur when the authorization key is registered on the customer's data processing system 10. The customer's data processing system 10 may have, for example, a serial number, and the authorization key 16 may specify a serial number. If the serial number of the authorization key 16 does not match the serial number of the customer's data processing system 10, the authorization key 16 may be rejected as invalid. The authorization key may also be encrypted, if desired.

Preferably, the performance level of the customer's data processing system 10 can be changed while the data processing system 10 is running, even at full production capacity. This may be accomplished under software control, such as under the control of the operating system 14. In one illustrative embodiment, and at the users request, the operating system 14 can selectively increase the utilization percentage of selected processors to affect the increased performance level of the data processing system 10. In another illustrative embodiment, and again at the users request, the operating system 14 may activate selected processors that were previously marked as unavailable. Such a system may help provide uninterrupted growth capacity, temporary increased processing capacity to support high demand peak periods, and disaster recovery support should a primary data processing system become destroyed.

FIG. 2 is a diagram showing an illustrative Instruction Processor (IP) authorization table of the data processing system of FIG. 1. The IP authorization table 18 identifies the resources that are currently authorized for use. In a preferred embodiment, the operating system 14 references the IP authorization table 18. IP authorization table 18 authorizes the use of IP-001 12a and IP-002 12b at a maximum utilization percentage of 67%. The remaining IPs 12c–12h are listed as unavailable for use.

A software controlled performance facility, preferably implemented in the kernel of the operating system 14, may help control which instruction processors 12a–12h can be "uped" by the customer, and at what utilization rate each processor can operate. If the customer attempts to "up" one of the unavailable processors 12c–12h, the software controlled performance facility may issue a warning message and prevent the operating system from "uping" the identified processor. Likewise, the software controlled performance facility may prevent the customer from attempting to increase the utilization of the available processors 12a–12b beyond the authorized maximum utilization percentage.

To control the maximum utilization percentage of the available instruction processors, the operating system may force the available processors 12a and 12b into a forced idle state for the specified percentage of time. This forced idle state is preferably achieved at the expense of non-critical system and user activities. The processing of critical system events such as interrupts (including pre- and post-processing of I/O interrupts), memory paging, and so on are preferably not delayed during forced idle. Forced idle is taken on an instruction processor basis rather than a system wide basis so a looping real-time activity cannot affect another instruction processor. This may be similar to that provided by the Unisys 2200 and ClearPath HMP systems, both of which are incorporated herein by reference.

FIG. 3 is a diagram showing an illustrative Instruction Processor (IP) table for the data processing system of FIG. 1 with four IP's authorized for use, each at a maximum performance level. For illustration purposes, the IP authorization table 20 may result from the registering of a second authorization key on the data processing system 10. The second authorization key may be configured to provide increased system performance relative to the IP authorization table 18 of FIG. 2. In the present example, this is accomplished by making IP-003 12c and IP-004 12d available for use, and by increasing the utilization of IP-001 12a and IP-002 12b to 100%.

Once the second authorization key is registered, the software controlled performance facility of the operating system 14 may reference IP table 20, and allow the customer to "up" IP-003 12c and IP-004 12d. The software controlled performance facility may also allow the customer to increase the utilization percentage of IP-001 12a and IP-002 12b to 100%. It is contemplated that the software controlled performance facility may automatically "up" IP-003 12c and IP-004 12d and increase the utilization percentage for all authorized processors to their maximum allowed rate. However, in a preferred embodiment, the software controlled performance facility merely allows the customer to make these changes.

Some data processing system have more than one power domain to help increase the reliability of the system. Each power domain typically has its own power supply, and may be electrically isolated from the other power domains. In this configuration, if one power domain goes down, the others may remain operational. Illustrative data processing systems that have multiple power domains include the Unisys 2200 and ClearPath HMP systems, available from the Unisys Corporation.

Figure 4:
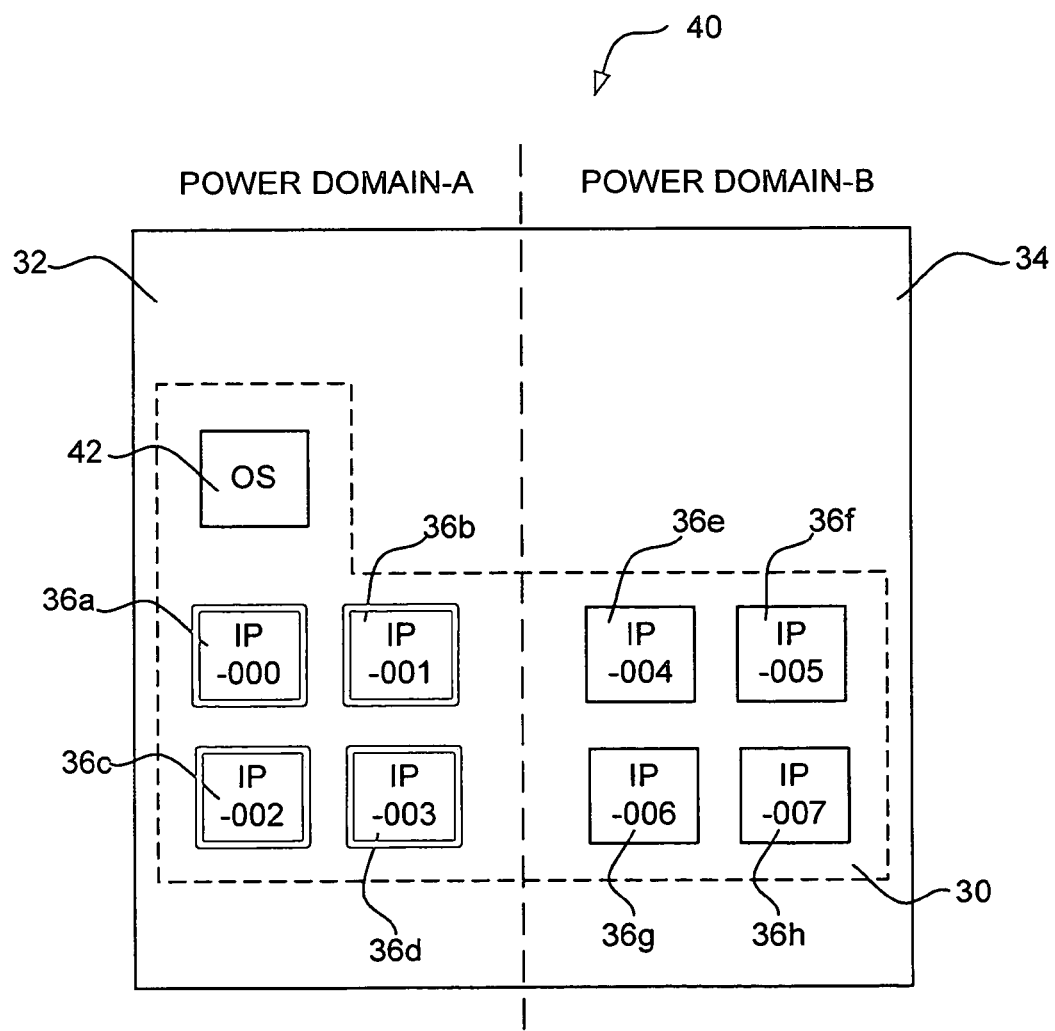
FIG. 4 is a block diagram showing an illustrative data processing system having two separate power domains, each with four processors installed, and a partition provided across the two power domains.

FIG. 4 is a block diagram showing an illustrative data processing system 40 having two separate power domains 32 and 34, each with four processors installed. A single OS partition 30 is defined to include all eight processors 36a–36h. Thus, partition 30 crosses the power domain boundary. All instruction processors 36a–36h are under the control of OS 42 of OS partition 30. The IPs that are initially authorized for use by, for example, a first authorization key include IPs 36a–36d in power domain 32. In the current example, IPs 36e–36h in power domain 34 are initially unavailable for use.

To help provide uninterrupted growth capacity, temporary increased processing capacity to support high demand peak periods, and disaster recovery support should a primary data processing system become destroyed, it is contemplated that a second authorization key may be purchased. The second authorization key may specify, for example, that any four (4) IPs can be used for a limited time period. In this example, if power domain 32 should fail, the customer can quickly down IPs 36a–36d and up IPs 36e–36f This can be done in a matter of minutes when done manually, or seconds or less if done automatically by the software controlled performance facility. In either case, the system may be back on-line in a very short period of time. This may significantly improve the reliability of the data processing system.

In another example, the second authorization key may specify, for example, that all eight (8) IPs can be used for a limited time period. Under this scenario, if the customer is experiencing peak loads that are significantly above the maximum performance level of the four IPs 36a–26d, the customer can "up" IPs 36e–36h to handle the increased load. This may help provide uninterrupted growth capacity and/or a temporary increase in processing capacity to support high demand peak loads.

Figure 5:
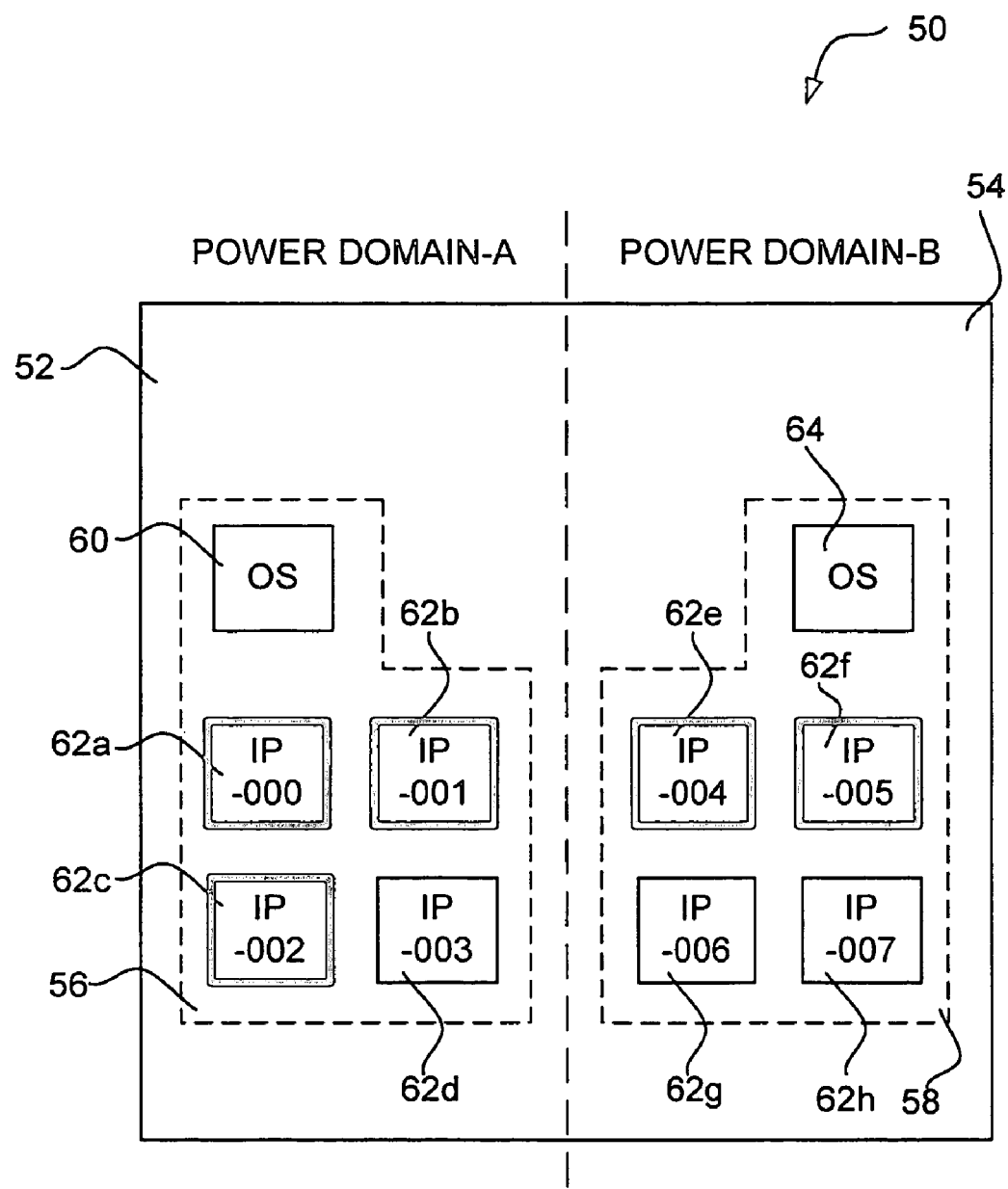
FIG. 5 is a block diagram showing an illustrative data processing system having two separate power domains, each with four processors installed, and a partition provided on each of the two power domains.

FIG. 5 is a block diagram showing an illustrative data processing system 50 having two separate power domains 52 and 54, each with four processors installed, and a partition provided on each of the two power domains 52 and 54. A first OS instance 60 controls all processors in the first partition 56, which in the example shown, includes processors 62a–62d. A second OS instance 64 controls all processors in the second partition 58, which in the example shown, includes processors 62e–62h. The IPs that are initially authorized for use by, for example, a first authorization key include IPs 62a–62c in power domain 52, and IPs 62e–62f in power domain 54.

In one example, and to help provide uninterrupted growth capacity or temporary increased processing capacity to support high demand peak loads, a second authorization key may be purchased. The second authorization key may specify, for example, that any four (4) IPs in the first power domain 56 can be used, and that any four (4) IPs in the second power domain 58 can be used. Thus, if the customer is experiencing peak loads that are significantly above the maximum performance level of either partition 56 or 58, the customer can "up" IP 62d in the first partition 56, and/or IPs 62g and 62h in the second power domain 58. This may help provide uninterrupted growth capacity and/or a temporary increase in processing capacity to support high demand peak loads.

In another example, and to help increase the reliability of the data processing system 50, partition 56 may be dedicated to processing the day-to-day operation of a business, and partition 58 may be dedicated to supporting development work or other tasks. In this example, partition 56 may be considered the primary data processing system and partition 58 may be considered the secondary data processing system. If the first power domain 52 goes down for any reason, partition 58 can be used to support the day-to-day operations of the business, and the development work can be temporarily suspended, if necessary. To maintain the same processing power, the customer can "up" IP 62g and/or IP 62h in partition 58. This may increase the processing power of partition 58 so that it can handle the day to day operations of the business. Once power domain 52 is restored, the day to day operations of the business can be switched back to partition 56. As can be seen, this may significantly increase the reliability of the data processing system 50.

Figure 6:
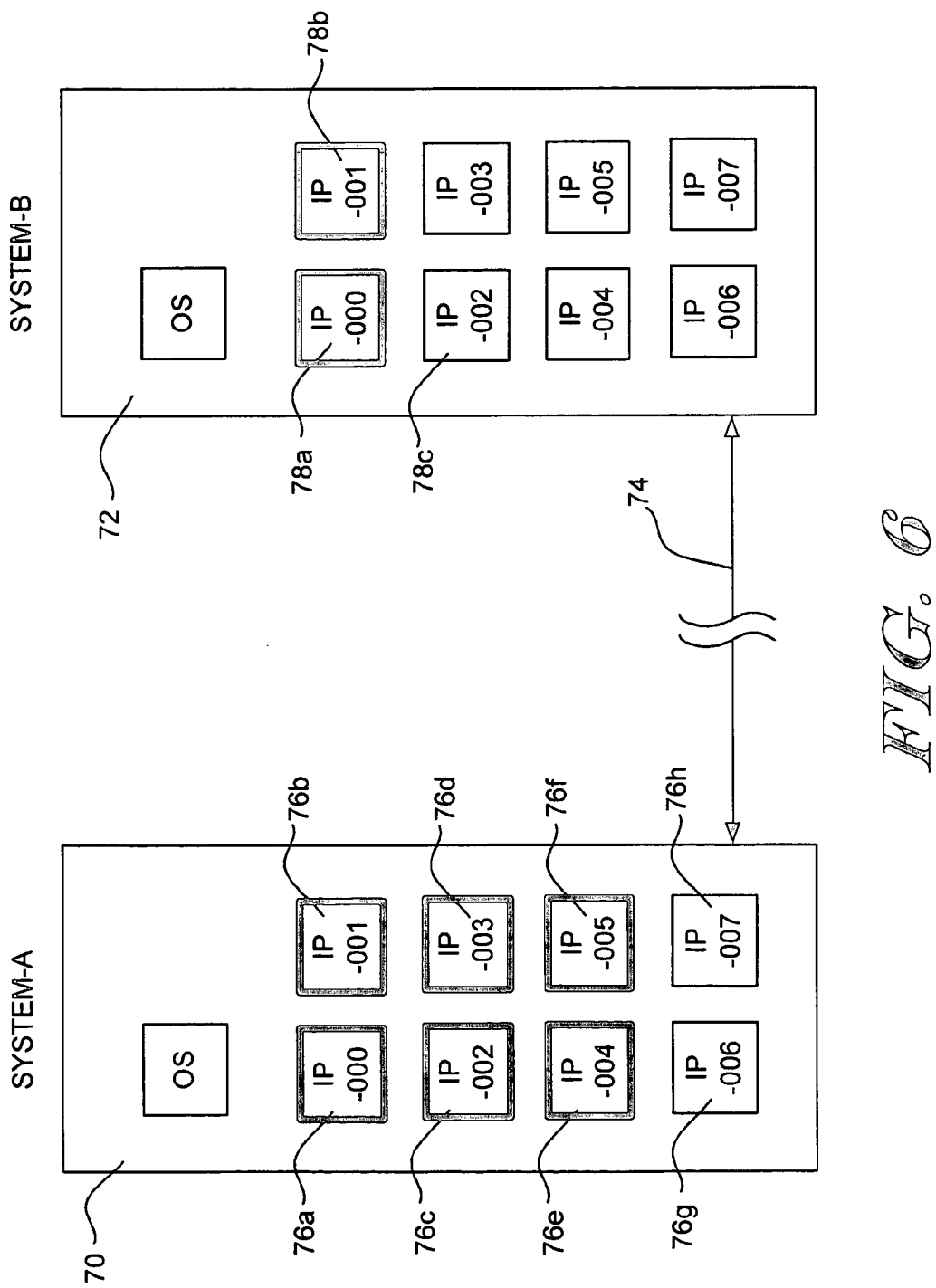
FIG. 6 is a block diagram showing a primary data processing system and a secondary data processing system connected together via a connection.

FIG. 6 is a block diagram showing a primary data processing system 70 and a secondary data processing system 72 connected together via connection 74. As indicated above, it is common for businesses to place their data processing systems in one or more data centers, often at different locations. This may help reduce the impact of an unexpected loss of one of the data processing systems because of, for example, a disaster or the like. In the illustrative embodiment shown, the primary data processing system 70 may be located at a first location, and the secondary data processing system 72 may be located at a second location.

In one embodiment, the primary data processing system 70 may be dedicated to processing the day-to-day operation of a business, and the secondary data processing system 72 may be dedicated to supporting development work or other tasks. The primary and secondary data processing systems 70 and 72 may have corresponding mirror disks to store all of the information produced by the other machine. The mirror disks may be connected by connection 74.

In the embodiment shown in FIG. 6, the primary data processing system 70 is initially authorized to use the six (6) IPs 76a–76f, but not IPs 76g and 76h. Likewise, the secondary data processing system 72 is initially authorized to use the two (2) IPs 78a–78b, but not IPs 78c–78h. This allocation of data processing resources reflects expected performance requirements of the primary data processing system 70 and secondary data processing system 72.

Should either of the primary 70 or secondary 72 data processing systems fail, such as by a disaster or the like, the remaining data processing system can be used to perform all of the processing previously performed by both machines. For example, if the primary data processing system 70 is destroyed, the secondary data processing system 72 can be used to support both the day-to-day operations of the business and the development work. To do so effectively, the customer can purchase an authorization key for the secondary data processing system 72 that authorizes the use of all eight IPs 78a–78h. Once the primary data processing system 70 is restored, the processing power of the secondary data processing system can be reduced to the original performance levels.

Likewise, if the secondary data processing system 72 is destroyed, the primary data processing system 70 can be used to support both the day-to-day operations of the business and the development work. The customer can simply purchase an authorization key for the primary data processing system 70 that authorizes the use of all eight IPs 76a–76h on the primary data processing system 70. Once the secondary data processing system 72 is restored, the performance level of the primary data processing system can be reduced to the original performance levels. As can be seen, this may significantly increase the reliability of the customer's data processing resources.

FIG. 7 is a diagram showing an illustrative authorization key for a two processor data processing system with one IP authorized for use. The illustrative authorization key includes a number of parameters, each having an attribute. Illustrative parameters include the model and serial numbers of the target data processing system, the maximum performance utilization allowed for the authorized IPs, the maximum number of authorized IPs, and an IP identifier field.

The model and serial numbers specified in the authorization key may be used to validate the authorization key when it is registered on a data processing system. For example, when the authorization key is registered, the software performance control facility may compare the model and serial numbers specified in the authorization key with the model and serial number of the data processing system. If they do not match, the authorization key may be rejected as invalid.

The authorization key illustrated in FIG. 7 may be initially provided with a two processor data processing system. The authorization key specifies the maximum number of authorized IPs as one. The authorization key also uniquely identifies the IP that is authorized for use, namely IP0.

To selectively increase the performance and/or reliability of the data processing system, an optional authorization key may be purchased. One such optional authorization key is shown in FIG. 8. The illustrative optional authorization key includes a model and serial number of the target data processing system, the maximum performance utilization allowed for the authorized IPs, the maximum number of authorized IPs, an IP identifier field, an expiration date and a maximum time of use field. In the example shown, the optional authorization key of FIG. 8 authorized the customer to use any one of the two IPs that are delivered with the system. In contrast, the normal authorization key of FIG. 7 only authorizes the use of a particular IP, namely IP0.

The optional authorization key is shown to expire on Jan. 1, 2001, and can be used for a period of ten (10) days. Preferably, the optional authorization key can be used cumulatively for ten days, and need not be used for ten consecutive days. Once the expiration date of the optional authorization key arrives, or the optional authorization key is used for more than ten days, the software performance control facility preferably automatically returns the data processing system to the original configuration, or in the case, the configuration authorized by the normal authorization key shown in FIG. 7. The software performance control facility preferably provides one or more messages to the customer, warning the customer of the impending configuration change. This may give the customer the opportunity to purchase an additional optional authorization key before the data processing system is returned to the original configuration.

FIG. 9 is a diagram showing an illustrative normal authorization key for an eight processor data processing system with four IP's authorized for use. The authorization key illustrated in FIG. 9 may be similar to one that is initially provided with an eight processor data processing system. The authorization key specifies the maximum number of authorized IPs as four. The authorization key also uniquely identifies the IPs that are authorized for use, namely, IP0, IP2, IP4 and IP6.

To selectively increase the performance and/or reliability of the data processing system, an optional authorization key may be purchased. One such optional authorization key is shown in FIG. 10. The illustrative optional authorization key shown in FIG. 10 authorized the customer to use any four of the eight IPs that are delivered with the system. In contrast, the normal authorization key of FIG. 9 only authorizes the use of IP0, IP2, IP4 and IP6.

The optional authorization key is shown to expire on Jan. 1, 2001, and can be used for a period of ten (10) days. Preferably, the optional authorization key can be used cumulatively for ten days, and need not be used for ten consecutive days. Once the expiration date of the optional authorization key arrives, or the optional authorization key is used for more than ten days, the software performance control facility preferably automatically returns the data processing system to the original configuration, or in this case, the configuration authorized by the normal authorization key shown in FIG. 9. The software performance control facility preferably provides one or more messages to the customer, warning the customer of the impending configuration change. This may give the customer the opportunity to purchase an additional optional authorization key before the data processing system is returned to the original configuration.

FIG. 11 is a diagram showing an illustrative normal authorization key for an eight processor data processing system with four IP's authorized for use, each at a reduced performance level. The authorization key illustrated in FIG. 11 may be similar to one that is initially provided with an eight processor data processing system. The authorization key specifies the maximum number of authorized IPs as four. The authorization key also uniquely identifies the IPs that are authorized for use, namely, IP0, IP2, IP4 and IP6. Finally, the authorization key specifies that the maximum utilization of any IP is 67%.

To selectively increase the performance and/or reliability of the data processing system, an optional authorization key may be purchased. One such optional authorization key is shown in FIG. 12. The illustrative optional authorization key shown in FIG. 12 authorized the customer to use all eight of the eight IPs that are delivered with the system. The normal authorization key of FIG. 12 also increases the maximum utilization of all IPs to 100%. These changes may significantly increase the performance of the data processing system.

Like the optional authorization keys discussed above, the optional authorization key is shown to expire on Jan. 1, 2001, and can be used for a period of ten (10) days. Preferably, the optional authorization key can be used cumulatively for ten days, and need not be used for ten consecutive days. Once the expiration date of the optional authorization key arrives, or the optional authorization key is used for more than ten days, the software performance control facility preferably automatically returns the data processing system to the original configuration, or in this case, the configuration authorized by the normal authorization key shown in FIG. 11. The software performance control facility preferably provides one or more messages to the customer, warning the customer of the impending configuration change. This may give the customer the opportunity to purchase an additional optional authorization key before the data processing system is returned to the original configuration.

Figure 13:
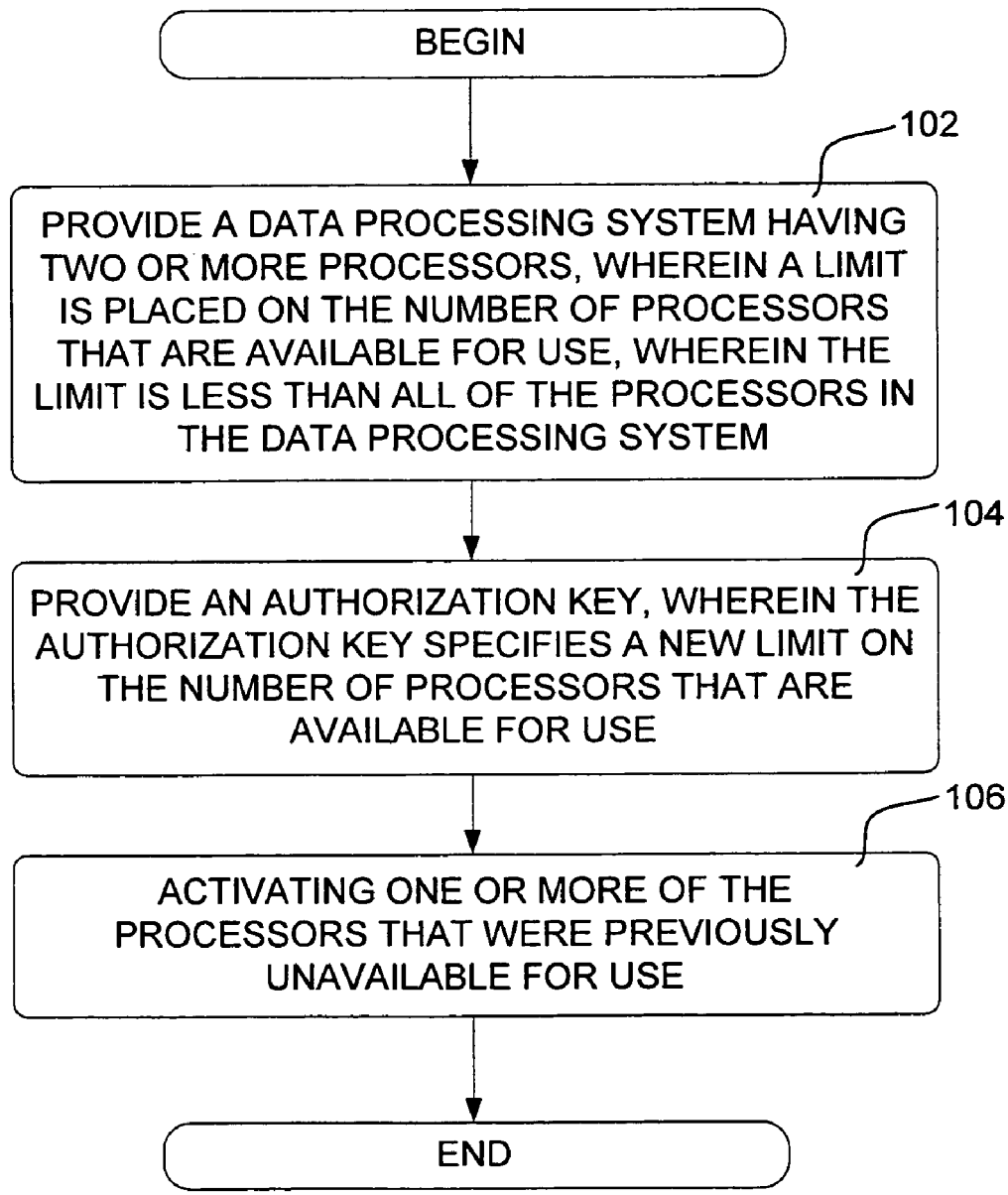
FIG. 13 is a flow diagram showing an illustrative method of the present invention.

FIG. 13 is a flow diagram showing an illustrative method of the present invention. First, and as shown at 102, a data processing system is provided that has two or more processors. The two or more processors are installed in the data processing system, and are in a hot standby mode. However, a limit is placed on the number of processors that are available for use. This may be accomplished by, for example, providing a normal or initial authorization key that provides authorization for the use of less than all of the processors.

Next, and as shown at 104, an authorization key, such as an optional authorization key is provided. The optional authorization key is preferably provided upon the customer's request, and may be provided on tape or delivered via e-mail to the customer's location. The optional authorization key may specify a new limit on the number of processors that are available for use. Once the optional authorization key is registered, one or more of the processors that were previously unavailable for use are activated to increase the performance of the customer's data processing system. The processors are preferably activated by the operating system of the data processing system.

Figure 14A:
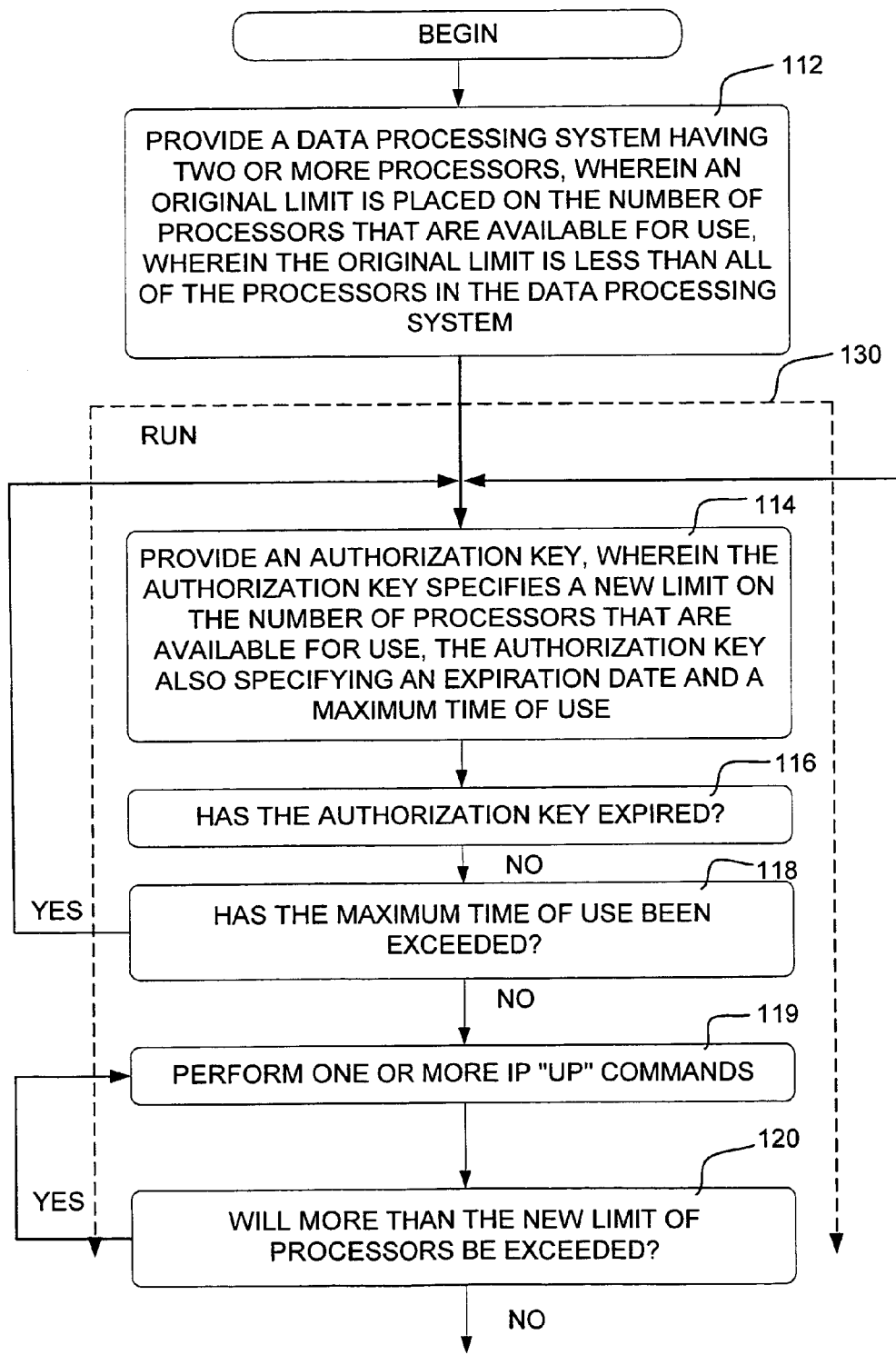
FIGS. 14A–14B are a flow diagram showing another illustrative method of the present invention.
Figure 14B:
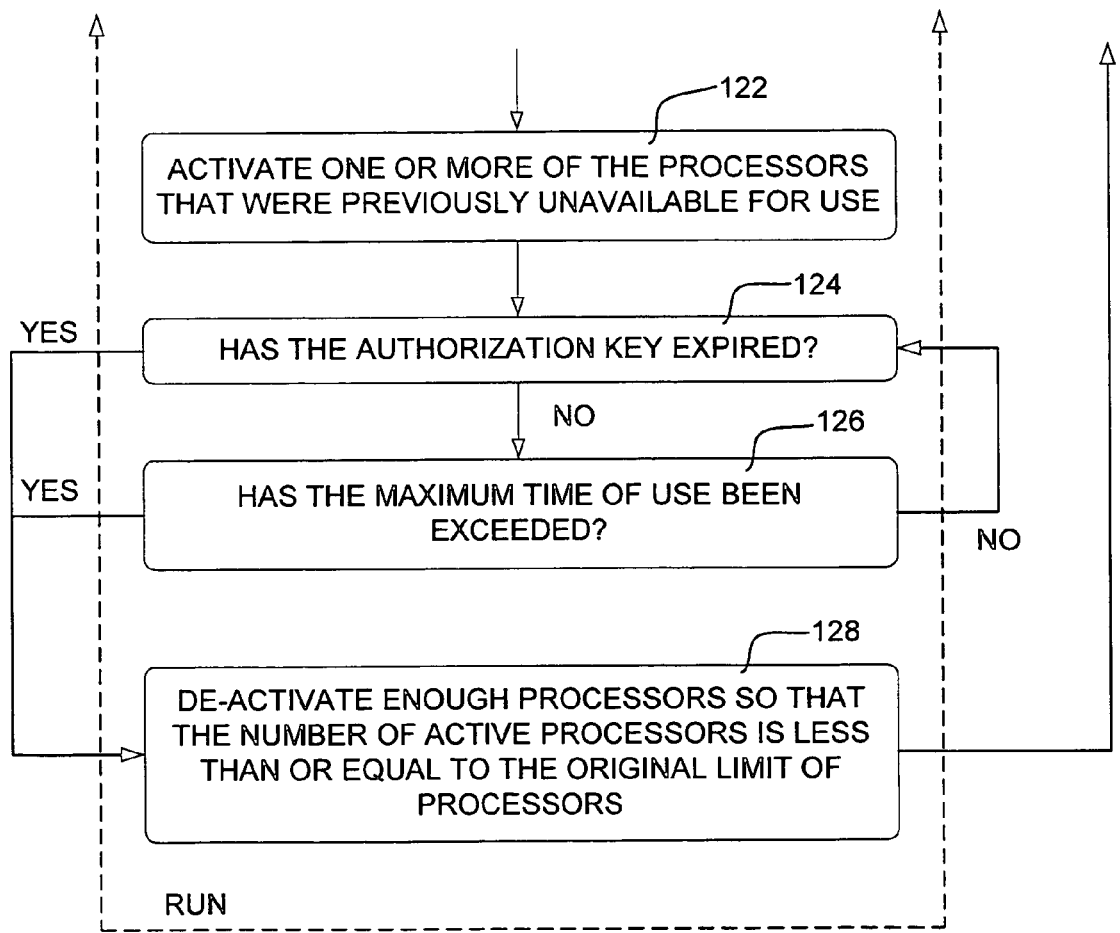

FIGS. 14A–14B are a flow diagram showing another illustrative method of the present invention. First, and as shown at 112, a data processing system is provided that has two or more processors. The two or more processors are installed in the data processing system, and are in a hot standby mode. However, an original limit is placed on the number of processors that are available for use. This may be accomplished by, for example, providing a normal or initial authorization key that provides authorization for the use of less than all of the processors.

Next, and as shown at 114, an authorization key, such as an optional authorization key is provided. The optional authorization key is preferably provided upon the customer's request, and may be provided on tape, or delivered via e-mail to the customer's location. The optional authorization key may specify a new limit on the number of processors that are available for use, and also an expiration date and a maximum time of use for the additional processors.

As shown at step 116, the data processing system checks to see if the optional authorization key has expired. This is preferably performed by a software performance control facility that compares the current date of the data processing system against the expiration date of the optional authorization key. If the current date equals or exceeds the expiration date, control is passed back to step 114.

If the optional authorization key has not expired, control is passed to step 118. Step 118 determines if the maximum time of use of the optional authorization key has been exceeded. This is also preferably performed by the software performance control facility, which keeps track of the amount of time the additional processors that are authorized for use by the optional authorization key are active. If the additional processors are active for more time than the maximum time of use, control is passed back to step 114. Both steps 116 and 118 may be performed when, for example, the optional authorization key is being registered for use.

If the maximum time of use has not been exceeded, control is passed to step 119. Step 119 performs one or more IP "up" commands. The IP "up" commands may be performed by the customer, or alternatively, by the software performance control facility. Step 120 determines if the IP "up" commands of step 119 would activate more processors than are authorized for use by the optional authorization key. If so, control is passed back to step 119. If not, control is passed to block 122 of FIG. 14B.

Step 122 activates one or more of the processors that were previously unavailable for use, as specified by the IP "up" commands of step 119. Once activated, control is passed to step 124. Step 124 periodically checks if the optional authorization key has expired. If the optional authorization key has expired, control is passed to step 128. If the optional authorization key has not expired, control is passed to step 126.

Step 126 determines if the maximum time of use of the optional authorization key has been exceeded. If the maximum time of use has been exceeded, control is passed to block 128. If the maximum time of use has not been exceeded control is passed back to step 124.

Step 128 de-activates enough of the processors so that the number of active processors is less than or equal to the original limit of processors. Step 128 may also only allow the specific processors that were authorized by an original authorization key. Once selected processors are de-activated, control is passed back to step 114.

It is contemplated that steps 114–128 may be performed while the data processing system is running, as shown at 130. Thus, additional processing resources may be added to the data processing system without bringing the data processing system down. This may help provide uninterrupted growth capacity, temporary increases in processing capacity to support high demand peak periods, and disaster recovery support should a primary data processing system fail or become destroyed.

Figure 15:
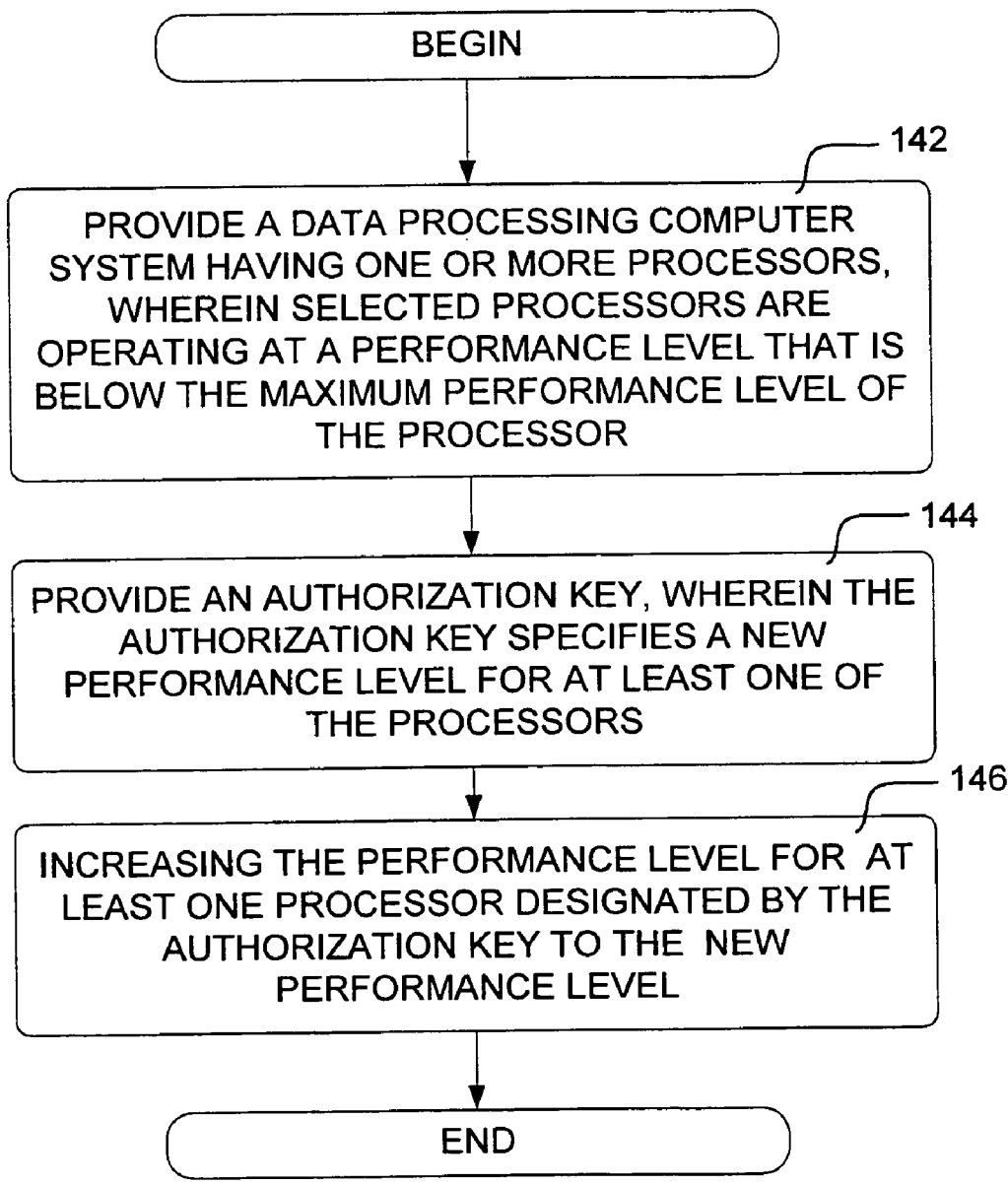
FIG. 15 is a flow diagram showing yet another illustrative method of the present invention.

FIG. 15 is a flow diagram showing yet another illustrative method of the present invention. First, and as shown at 142, a data processing system is provided that has one or more processors. The one or more processors are installed in the data processing system, and are in a hot standby mode. However, a limit is placed on the maximum utilization of selected processors so that the authorized performance level is below the maximum performance level of the processor.

Next, and as shown at 144, an authorization key, such as an optional authorization key is provided. The optional authorization key is preferably provided upon the customer's request, and may be provided on tape, or delivered via e-mail to the customer's location. The optional authorization key may specify a new utilization percentage for selected processors, which produces a new performance level for the selected processors. Once the optional authorization key is registered, the utilization percentage of the selected processors are increased to the new utilization percentage specified by the optional authorization key, as shown at step 146. The utilization percentage of the selected processors is preferably increased via the operating system of the data processing system.

Figure 16A:
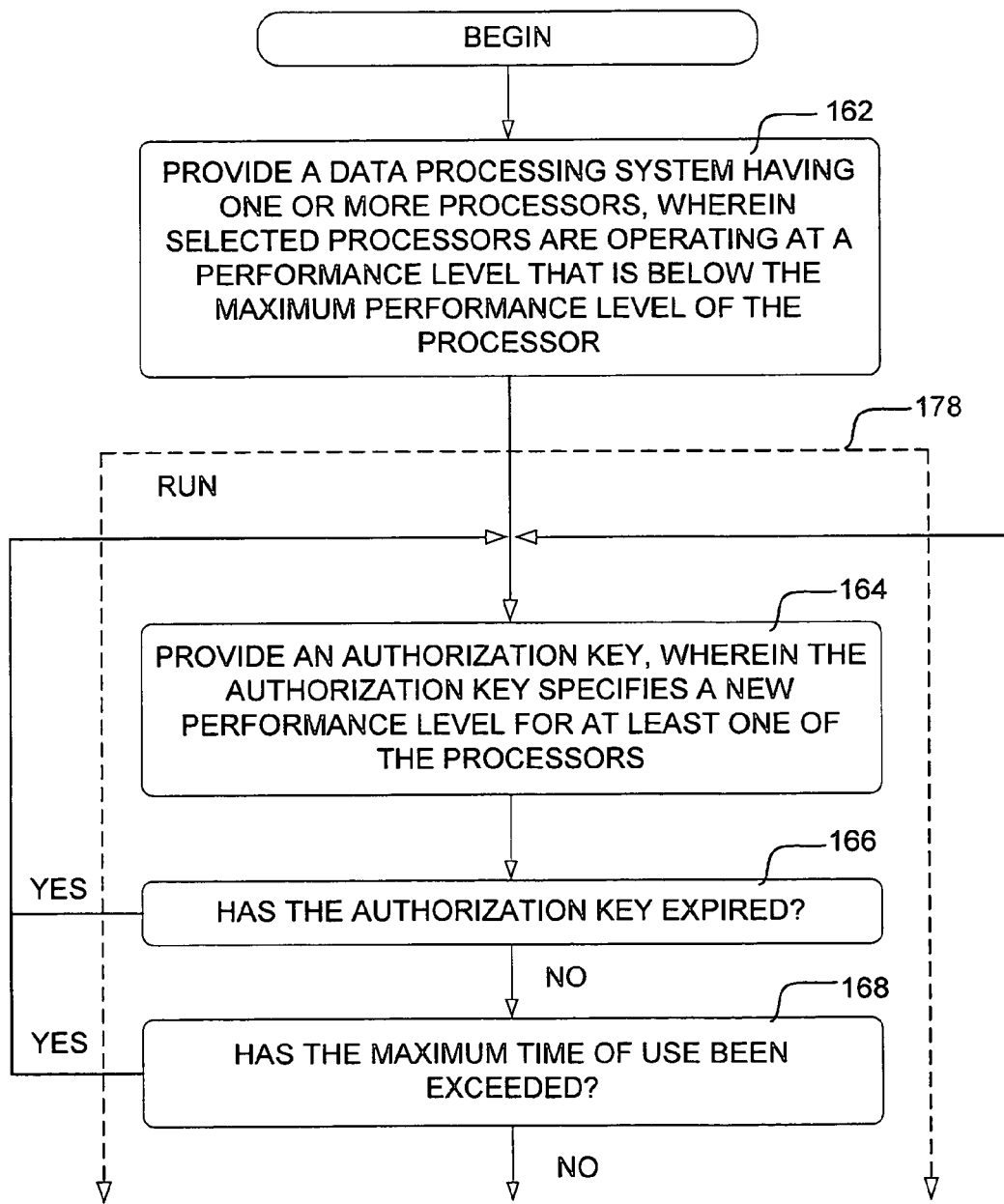
FIGS. 16A–16B are a flow diagram showing another illustrative method of the present invention.
Figure 16B:
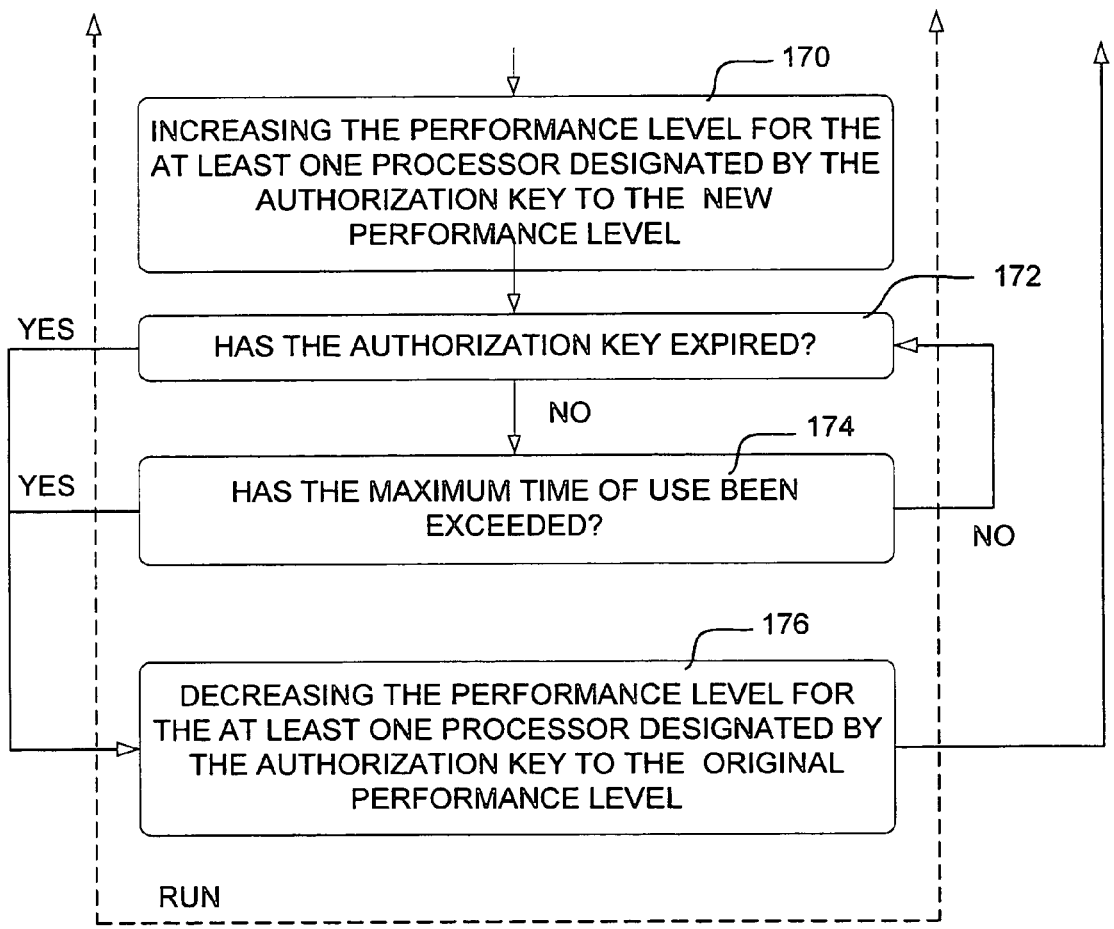

FIGS. 16A–16B are a flow diagram showing another illustrative method of the present invention. First, and as shown at 162, a data processing system is provided that has one or more processors. The one or more processors are installed in the data processing system, and are in a hot standby mode. However, a limit is placed on the maximum utilization of selected processors so that the authorized performance level of those processors is below the maximum performance level.

Next, and as shown at 164, an authorization key, such as an optional authorization key is provided. The optional authorization key may specify a new utilization percentage for selected processors, which produces a new performance level for the selected processors.

As shown at step 166, the data processing system checks to see if the optional authorization key has expired. This is preferably performed by a software performance control facility that compares the current date of the data processing system against the expiration date of the optional authorization key. If the current date equals or exceeds the expiration date, control is passed back to step 164.

If the optional authorization key has not expired, control is passed to step 168. Step 168 determines if the maximum time of use of the optional authorization key has been exceeded. This is also preferably performed by the software performance control facility, which keeps track of the amount of time that the increased utilization percentage authorized for use by the optional authorization key is active. If the increased utilization percentage is active for more time than the maximum time of use, control is passed back to step 164. Both steps 166 and 168 may be performed when, for example, the optional authorization key is being registered for use.

If the maximum time of use has not been exceeded, control is passed to step 170. Step 119 increases the utilization percentage of the designated processors. This may be manually performed by the customer, or alternatively, by the software performance control facility. Once the utilization percentage is increased, control is passed to step 172. Step 172 periodically checks if the optional authorization key has expired. If the optional authorization key has expired, control is passed to step 176. If the optional authorization key has not expired, control is passed to step 174.

Step 174 determines if the maximum time of use of the optional authorization key has been exceeded. If the maximum time of use has been exceeded, control is passed to block 176. If the maximum time of use has not been exceeded, control is passed back to step 172.

Step 176 reduces the utilization percentage of selected processors designated by the expired authorization key to the original utilization percentage. This returns the data processing system to the original performance level. Once the data processing system is returned to the original performance level, control is passed back to step 164.

It is contemplated that steps 164–176 may be performed while the data processing system is running, as shown at 178. Thus, the performance level of the data processing system may be increased without bringing the data processing system down. This may help provide uninterrupted growth capacity, temporary increases in processing capacity to support high demand peak periods, and disaster recovery support should a primary data processing system fail or become destroyed.

Figure 17A:
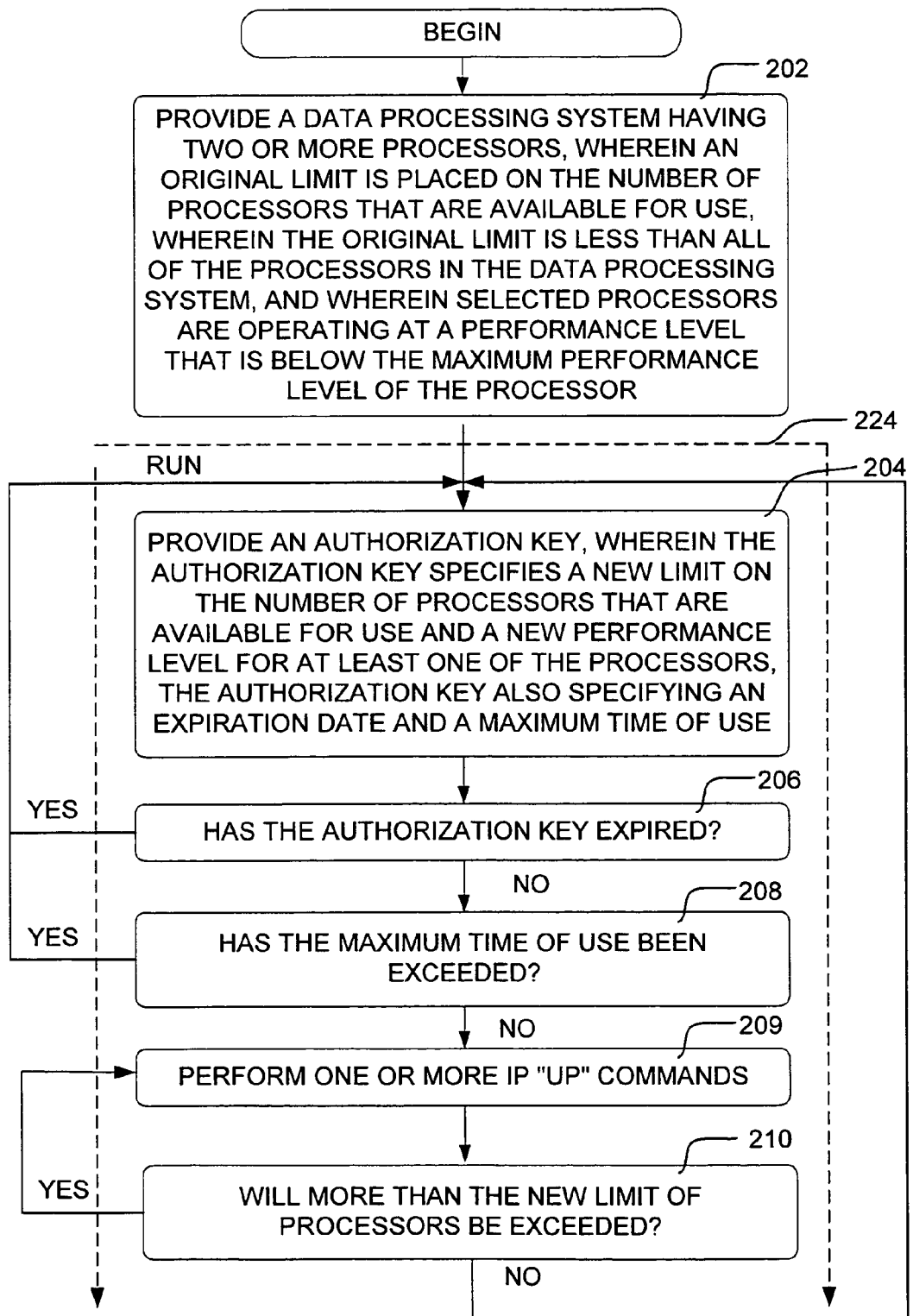
FIGS. 17A–17B are a flow diagram showing yet another illustrative method of the present invention.
Figure 17B:
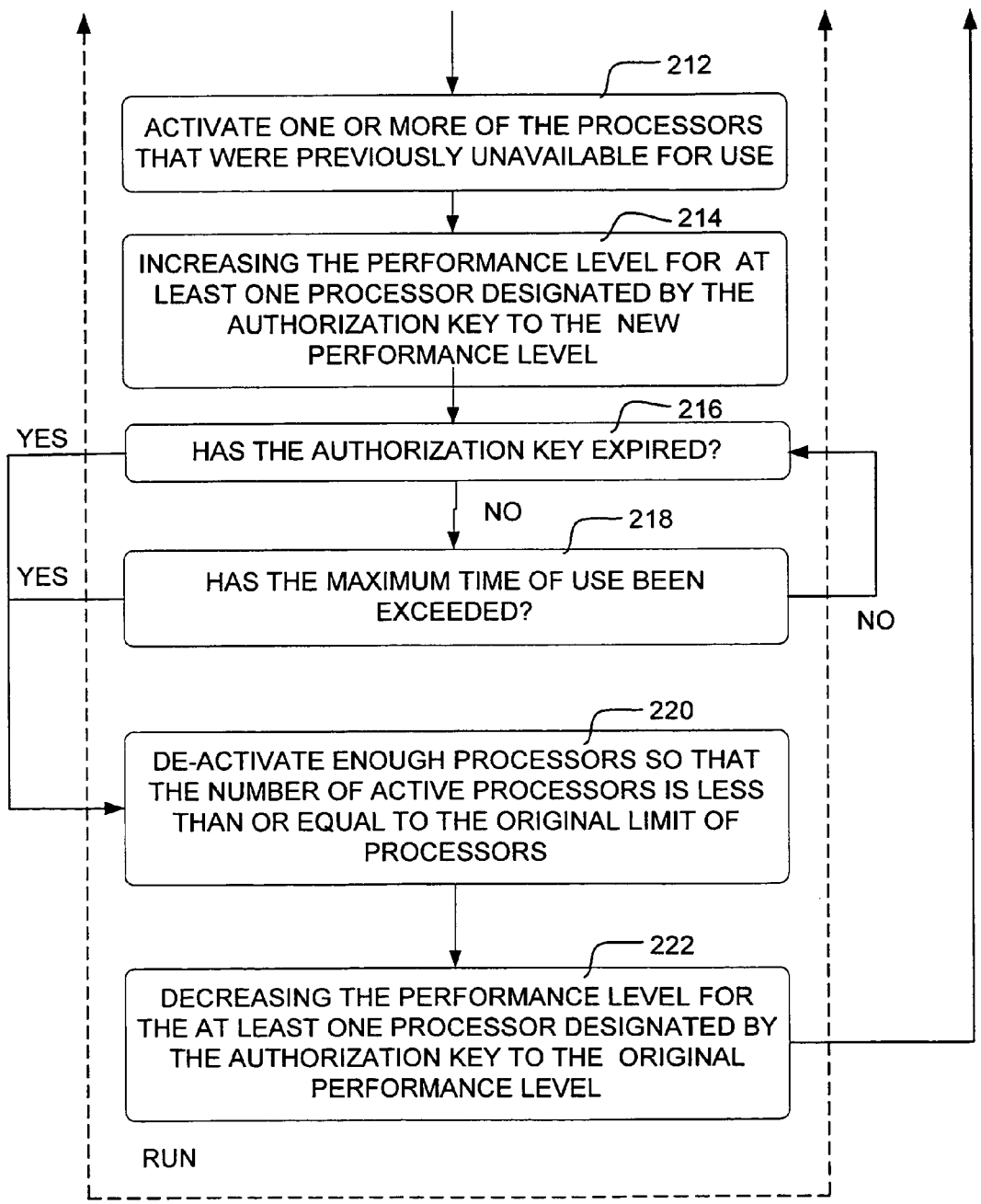

FIGS. 17A–17B are a flow diagram showing yet another illustrative method of the present invention. First, and as shown at 202, a data processing system is provided that has two or more processors. The two or more processors are installed in the data processing system, and are in a hot standby mode. However, an original limit is placed on the number of processors that are available for use. In addition, a limit is placed on the maximum utilization of selected processors so that the authorized performance level of those processors is below the maximum performance level. This may be accomplished by, for example, providing a normal or initial authorization key, as described above.

Next, and as shown at 204, an authorization key, such as an optional authorization key is provided. The optional authorization key is preferably provided upon the customer's request, and may be provided on tape, or delivered via e-mail to the customer's location. The optional authorization key may specify a new limit on the number of processors that are available for use, and may further specify a new utilization percentage for selected processors, which produces a new performance level for the selected processors. The optional authorization key may also specify an expiration date and a maximum time of use for the authorization key.

As shown at step 206, the data processing system checks to see if the optional authorization key has expired. This is preferably performed by a software performance control facility that compares the current date of the data processing system against the expiration date of the optional authorization key. If the current date equals or exceeds the expiration date, control is passed back to step 204.

If the optional authorization key has not expired, control is passed to step 208. Step 208 determines if the maximum time of use of the optional authorization key has been exceeded. This is also preferably performed by the software performance control facility, which keeps track of the amount of time the additional resources designated by the optional authorization key are active. If the optional authorization key is active for more time than the maximum time of use, control is passed back to step 204. Both steps 206 and 208 may be performed when, for example, the optional authorization key is being registered for use.

If the maximum time of use has not been exceeded, control is passed to step 209. Step 209 performs one or more IP "up" commands. The IP "up" commands may be performed by the customer, or alternatively, by the software performance control facility. Step 210 determines if the IP "up" commands of step 209 would activate more processors than are authorized for use by the optional authorization key. If so, control is passed back to step 209. If not, control is passed to block 212 of FIG. 17B.

Step 212 activates one or more of the processors that were previously unavailable for use, as specified by the IP "up" commands of step 209. Once activated, control is passed to step 214. Step 119 increases the utilization percentage of the processors designated by the optional authorization key. This may be manually performed by the customer, or alternatively, by the software performance control facility. Once the utilization percentage is increased, control is passed to step 216.

Step 216 periodically checks if the optional authorization key has expired. If the optional authorization key has expired, control is passed to step 220. If the optional authorization key has not expired, control is passed to step 218.

Step 218 determines if the maximum time of use of the optional authorization key has been exceeded. If the maximum time of use has been exceeded, control is passed to block 220. If the maximum time of use has not been exceeded, control is passed back to step 216.

Step 220 de-activates enough of the processors so that the number of active processors is less than or equal to the original limit of processors. Step 220 may also only allow the specific processors that were authorized by an original authorization key. Once selected processors are de-activated, control is passed back to step 222.

Step 222 reduces the utilization percentage of selected processors designated by the expired authorization key to the original utilization percentage. Once the utilization percentage is reduced to the original level, control is passed back to step 204.

It is contemplated that steps 204–222 may be performed while the data processing system is running, as shown at 224. Thus, additional processing resources may be added to the data processing system without bringing the data processing system down. This may help provide uninterrupted growth capacity, temporary increases in processing capacity to support high demand peak periods, and disaster recovery support should a primary data processing system fail or become destroyed.

Having thus described the preferred embodiments of the present invention, those of skill in the art will readily appreciate that the teachings found herein may be applied to yet other embodiments within the scope of the claims hereto attached.

What is claimed is:

1. A method for selectively increasing the performance of a customer's data processing system, wherein the data processing system has a maximum processing performance level, the method comprising:

providing a first authorization key to the data processing system, the first authorization key allowing an initial processing performance level that is less than the maximum processing performance level of the data processing system;

receiving a request from the customer for an increase in processing performance level of the data processing system;

providing a second authorization key to increase the processing performance level of the data processing system above the initial processing performance level; and increasing the processing performance level of the data processing system in accordance with the second authorization key without having to bring down the data processing system.

2. A method according to claim 1, wherein the second authorization key has an expiration date.

3. A method according to claim 2, wherein the data processing system returns to the initial processing performance level when the second authorization key expires.

4. A method according to claim 1, wherein the second authorization key has a maximum time of use, the maximum time of use specifying the maximum time that the data processing system can execute above the initial processing performance level.

5. A method according to claim 4, wherein the data processing system returns to the initial processing performance level when the maximum time of use specified by the second authorization key is reached.

6. A method for selectively changing the processing performance of a data processing system, wherein the data processing system includes one or more processors that can selectively operate at a processing performance level that is below a maximum processing performance level of the processor, the method comprising:

providing an authorization key to the data processing system, wherein the authorization key specifies a new processing performance level for at least one of the processors; and increasing the processing performance level of at least one processor to the new processing performance level without having to bring down the data processing system.

7. A method according to claim 6, wherein the providing and increasing steps are performed while the data processing system is in use.

8. A method according to claim 6, wherein the authorization key is encrypted, and the authorization key is decrypted before use.

9. A method according to claim 6, further comprising the step of verifying the authorization key.

10. A method according to claim 9, wherein the data processing system has a corresponding serial number and the authorization key specifies a serial number, the verifying step comparing the serial number of the data processing system to the serial number of the authorization key.

11. A method according to claim 10, further comprising the step of preventing the increasing step if the serial number of the authorization key does not match the serial number of the data processing system.

12. A method according to claim 9, wherein the data processing system maintains a current date and the authorization key specifies an expiration date, the verifying step comparing the expiration date of the authorization key to the current date maintained by the data processing system to determine if the authorization key has expired.

13. A method according to claim 12, further comprising the step of preventing the increasing step if the authorization key has expired.

14. A method according to claim 12, further comprising the step of decreasing the processing performance level of the at least one processor designated by the authorization key to a previous processing performance level when the authorization key expires.

15. A method according to claim 9, wherein the data processing system maintains a time of increased processing performance level of the at least one processor and the authorization key specifies a maximum time of use, the verifying step determining if the time of increased processing performance level of the at least one processor exceeds the maximum time of use.

16. A method according to claim 15, further comprising the step of preventing the increasing step if the time of increased processing performance level of the at least one processor has exceeded the maximum time of use.

17. A method according to claim 15, further comprising the step of decreasing the processing performance level of the at least one processor designated by the authorization key to a previous processing performance level when the time of increased processing performance level of the at least one processor exceeds the maximum time of use.

18. A method according to claim 6, wherein the processing performance level of the at least one processor is increased under software control.

19. A method according to claim 18, wherein the processing performance level of the at least one processor is increased under the control of the operating system of the data processing system.

20. A method according to claim 19, wherein the operating system maintains a table that includes entries that identify the processors in the data processing system, and further identify the allowed processing performance level of each processor.

21. A method according to claim 20, wherein the processing performance level of selected processors is increased by changing the corresponding entries in the table to a new pressing performance level.

22. A method according to claim 21, wherein the operating system detects the changes in the table, and changes the processing performance level of the corresponding processors to the new processing performance level.

23. A method according to claim 22, further comprising changing selected entries in the table so that the processing performance level of selected processors are returned to a previous processing performance level.

24. A method for selectively changing the performance of a data processing system, wherein the data processing system includes two or more processors and an original limit is placed on the number of processors that are available for use, the method comprising:

providing an authorization key to the data processing system, wherein the authorization key specifies a new limit on the number of processors that are available for use; and increasing the performance level of the data processing system by activating one or more of the processors that were previously unavailable for use without having to bring down the data processing system.

25. A method according to claim 24, wherein the one or more processors are activated under software control.

26. A method according to claim 24, further comprising the step of verifying the use of the authorization key.

27. A method according to claim 26, wherein the data processing system has a corresponding serial number and the authorization key specifies a serial number, the verifying step includes comparing the serial number of the data processing system to the serial number of the authorization key.

28. A method according to claim 26, wherein the data processing system maintains a current date and the authorization key specifies an expiration date, the verifying step comparing the expiration date of the authorization key to the current date maintained by the data processing system to determine if the authorization key has expired.

29. A method according to claim 28, further comprising the step of preventing the increasing step if the authorization key has expired.

30. A method according to claim 28, further comprising the step of de-activating selected processors so that the number of active processors is less than oT equal to the original limit of processors when the authorization key expires.

31. A method according to claim 26, wherein the authorization key specifies a maximum time of use, the verifying step determining if the time of the increased processing performance level of the data processing system exceeds the maximum time of use.

32. A method according to claim 31, further comprising the step of preventing the increasing step if the time of the increased processing performance level of the data processing system exceeds the maximum time of use.

33. A method according to claim 31, further comprising the step of de-activating enough processors so that the number of active processors is less than or equal to the original limit of processors when the time of the increased processing performance level of the data processing system exceeds the maximum time of use.

34. A method according to claim 24, wherein the providing and increasing steps are performed while the data processing system is in use.

35. A method according to claim 25, wherein the one or more processors are activated by the operating system of the data processing system.

36. A method according to claim 35, wherein the operating system maintains a table that includes entries that identify the processors in the data processing system, and further identify which processors are available for use.

37. A method according to claim 36, wherein the increasing step changes selected entries in the table to indicate that one or more of the processors that were previously unavailable for use are now available for use.

38. A method according to claim 37, wherein the operating system detects the changes to the table, and activates the processors that are indicated as available for use that were previously unavailable for use.

39. A method according to claim 38, further comprising changing selected entries in the table so that selected processors that are available for use are de-activated and become unavailable for use to return to the original limit of the number of processors that are available for use.

40. A method according to claim 39, wherein the operating system detects the changes to the table, and de-activates the processors that are indicated as unavailable for use.

\* \* \* \* \*

UNITED STATES PATENT AND TRADEMARK OFFICE
CERTIFICATE OF CORRECTION

PATENT NO. : 6,978,374 B1
DATED : December 20, 2005
INVENTOR(S) : Lee B. Hansen et al.

It is certified that error appears in the above-identified patent and that said Letters Patent is hereby corrected as shown below:

Column 16,
Line 51, "pressing" should read -- processing --.

Column 17,
Line 30, "oT" should read -- or --.

Signed and Sealed this

Fourteenth Day of March, 2006

JON W. DUDAS
*Director of the United States Patent and Trademark Office*